US012750777B2

(12) United States Patent
Tayyab

(10) Patent No.: US 12,750,777 B2
(45) Date of Patent: Sep. 29, 2026

(54) CONDITIONAL WAKE UP SIGNAL FOR ENERGY HARVESTING DEVICES

(71) Applicant: Nokia Technologies Oy, Espoo (FI)

(72) Inventor: Muhammad Tayyab, Oulu (FI)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 18/416,015

(22) Filed: Jan. 18, 2024

(65) Prior Publication Data

US 2024/0251351 A1 Jul. 25, 2024

Related U.S. Application Data

(60) Provisional application No. 63/440,791, filed on Jan. 24, 2023.

(51) Int. Cl.
*H04W 52/02* (2009.01)
*H04W 76/28* (2018.01)

(52) U.S. Cl.
CPC ... *H04W 52/0229* (2013.01); *H04W 52/0216* (2013.01); *H04W 76/28* (2018.02)

(58) Field of Classification Search
CPC ......... H04W 52/0229; H04W 52/0216; H04W 76/28; H04W 52/0235; H04W 52/0232; H04W 52/0248; Y02D 30/70
See application file for complete search history.

(56) References Cited

U.S. PATENT DOCUMENTS 12,207,198 B2 * 1/2025 Xu ........................ H04W 76/28
2018/0310247 A1 * 10/2018 Chu .................. H04W 52/0235
2020/0229095 A1 * 7/2020 Shrestha ............... H04W 68/00
2021/0076328 A1 * 3/2021 Nigg .................. G01N 33/0073
2022/0078879 A1 * 3/2022 Nimbalker ............ H04W 76/28
2023/0319715 A1 * 10/2023 Zhang ................... H04W 68/02
455/574
2023/0328649 A1 * 10/2023 Xu ........................ H04W 76/28
370/311

(Continued)

OTHER PUBLICATIONS

"New SID: Study on low-power Wake-up Signal and Receiver for NR", 3GPP TSG RAN meeting #94e, RP-213645, Agenda Item: 8A.1, vivo, Dec. 6-17, 2021, 4 pages.

(Continued)

*Primary Examiner* — Md K Talukder
(74) *Attorney, Agent, or Firm* — Barta Jones, PLLC

(57) ABSTRACT

An apparatus may be configured to: transmit a request for conditional wake-up signal operation; receive at least one parameter for the conditional wake-up signal operation; receive at least one signal, wherein the at least one signal comprises one of: a wake-up signal, a wake-up indicator, a wake-up signal beacon, or a signal configured to be measured with a wake-up receiver; in response to the receiving of the at least one signal, determine a current energy level; and transmit a conditional wake-up signal operation acknowledgement based, at least partially, on the current energy level. An apparatus may be configured to: receive, from a UE capable of performing energy harvesting, a request for conditional wake-up signal operation; transmit, to the UE, at least one parameter for the conditional wake-up signal operation; transmit at least one signal for the UE; and receive, from the UE, a conditional wake-up signal operation acknowledgement.

6 Claims, 8 Drawing Sheets

(56) References Cited

U.S. PATENT DOCUMENTS

| | | | | |
|---|---|---|---|---|
| 2024/0114456 | A1 * | 4/2024 | Mahalingam ..... | H04W 52/0229 |
| 2024/0251351 | A1 * | 7/2024 | Tayyab ............. | H04W 52/0235 |
| 2024/0276376 | A1 * | 8/2024 | Kadan Veedu ... | H04W 52/0229 |
| 2025/0016675 | A1 * | 1/2025 | Höglund ........... | H04W 52/0245 |

OTHER PUBLICATIONS

Rostami et al., "Novel Wake-up Scheme for Energy-Efficient Low-Latency Mobile Devices in 5G Networks", IEEE Transactions on Mobile Computing, vol. 20, No. 4, Apr. 2021, pp. 1511-1528.

* cited by examiner

CONDITIONAL WAKE UP SIGNAL FOR ENERGY HARVESTING DEVICES

BACKGROUND

It is known, in network devices, to perform discontinuous reception to reduce power consumption.

FIELD OF EMBODIMENTS

The example and non-limiting embodiments relate generally to wake-up signaling and, more particularly, to wake-up signaling for energy harvesting devices.

BRIEF SUMMARY OF EMBODIMENTS

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: transmit a request for conditional wake-up signal operation; receive at least one parameter for the conditional wake-up signal operation; receive at least one signal, wherein the at least one signal comprises one of: a wake-up signal, a wake-up indicator, a wake-up signal beacon, or a signal configured to be measured with a wake-up receiver; in response to the receiving of the at least one signal, determine a current energy level; and transmit a conditional wake-up signal operation acknowledgement based, at least partially, on the current energy level.

In accordance with one aspect, a method comprising: transmitting, with a user equipment, a request for conditional wake-up signal operation; receiving at least one parameter for the conditional wake-up signal operation; receiving at least one signal, wherein the at least one signal comprises one of: a wake-up signal, a wake-up indicator, a wake-up signal beacon, or a signal configured to be measured with a wake-up receiver; in response to the receiving of the at least one signal, determining a current energy level; and transmitting a conditional wake-up signal operation acknowledgement based, at least partially, on the current energy level.

In accordance with one aspect, an apparatus comprising means for performing: transmitting a request for conditional wake-up signal operation; receiving at least one parameter for the conditional wake-up signal operation; receiving at least one signal, wherein the at least one signal comprises one of: a wake-up signal, a wake-up indicator, a wake-up signal beacon, or a signal configured to be measured with a wake-up receiver; in response to the receiving of the at least one signal, determining a current energy level; and transmitting a conditional wake-up signal operation acknowledgement based, at least partially, on the current energy level.

In accordance with one aspect, a non-transitory computer-readable medium comprising program instructions stored thereon for performing at least the following: causing transmitting of a request for conditional wake-up signal operation; causing receiving of at least one parameter for the conditional wake-up signal operation; causing receiving of at least one signal, wherein the at least one signal comprises one of: a wake-up signal, a wake-up indicator, a wake-up signal beacon, or a signal configured to be measured with a wake-up receiver; in response to the receiving of the at least one signal, determining a current energy level; and causing transmitting of a conditional wake-up signal operation acknowledgement based, at least partially, on the current energy level.

In accordance with one aspect, an apparatus comprising: at least one processor; and at least one memory storing instructions that, when executed by the at least one processor, cause the apparatus at least to: receive, from a user equipment capable of performing energy harvesting, a request for conditional wake-up signal operation; transmit, to the user equipment, at least one parameter for the conditional wake-up signal operation; transmit at least one signal for the user equipment, wherein the at least one signal comprises one of: a wake-up signal, a wake-up indicator, a wake-up signal beacon, or a signal configured to be measured with a wake-up receiver; and receive, from the user equipment, a conditional wake-up signal operation acknowledgement.

In accordance with one aspect, a method comprising: receiving, with a base station from a user equipment capable of performing energy harvesting, a request for conditional wake-up signal operation; transmitting, to the user equipment, at least one parameter for the conditional wake-up signal operation; transmitting at least one signal for the user equipment, wherein the at least one signal comprises one of: a wake-up signal, a wake-up indicator, a wake-up signal beacon, or a signal configured to be measured with a wake-up receiver; and receiving, from the user equipment, a conditional wake-up signal operation acknowledgement.

In accordance with one aspect, an apparatus comprising means for performing: receiving, from a user equipment capable of performing energy harvesting, a request for conditional wake-up signal operation; transmitting, to the user equipment, at least one parameter for the conditional wake-up signal operation; transmitting at least one signal for the user equipment, wherein the at least one signal comprises one of: a wake-up signal, a wake-up indicator, a wake-up signal beacon, or a signal configured to be measured with a wake-up receiver; and receiving, from the user equipment, a conditional wake-up signal operation acknowledgement.

In accordance with one aspect, a non-transitory computer-readable medium comprising program instructions stored thereon for performing at least the following: causing receiving, from a user equipment capable of performing energy harvesting, of a request for conditional wake-up signal operation; causing transmitting, to the user equipment, of at least one parameter for the conditional wake-up signal operation; causing transmitting of at least one signal for the user equipment, wherein the at least one signal comprises one of: a wake-up signal, a wake-up indicator, a wake-up signal beacon, or a signal configured to be measured with a wake-up receiver; and causing receiving, from the user equipment, of a conditional wake-up signal operation acknowledgement.

According to some aspects, there is provided the subject matter of the independent claims. Some further aspects are defined in the dependent claims.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION OF EMBODIMENTS

Figure 1:
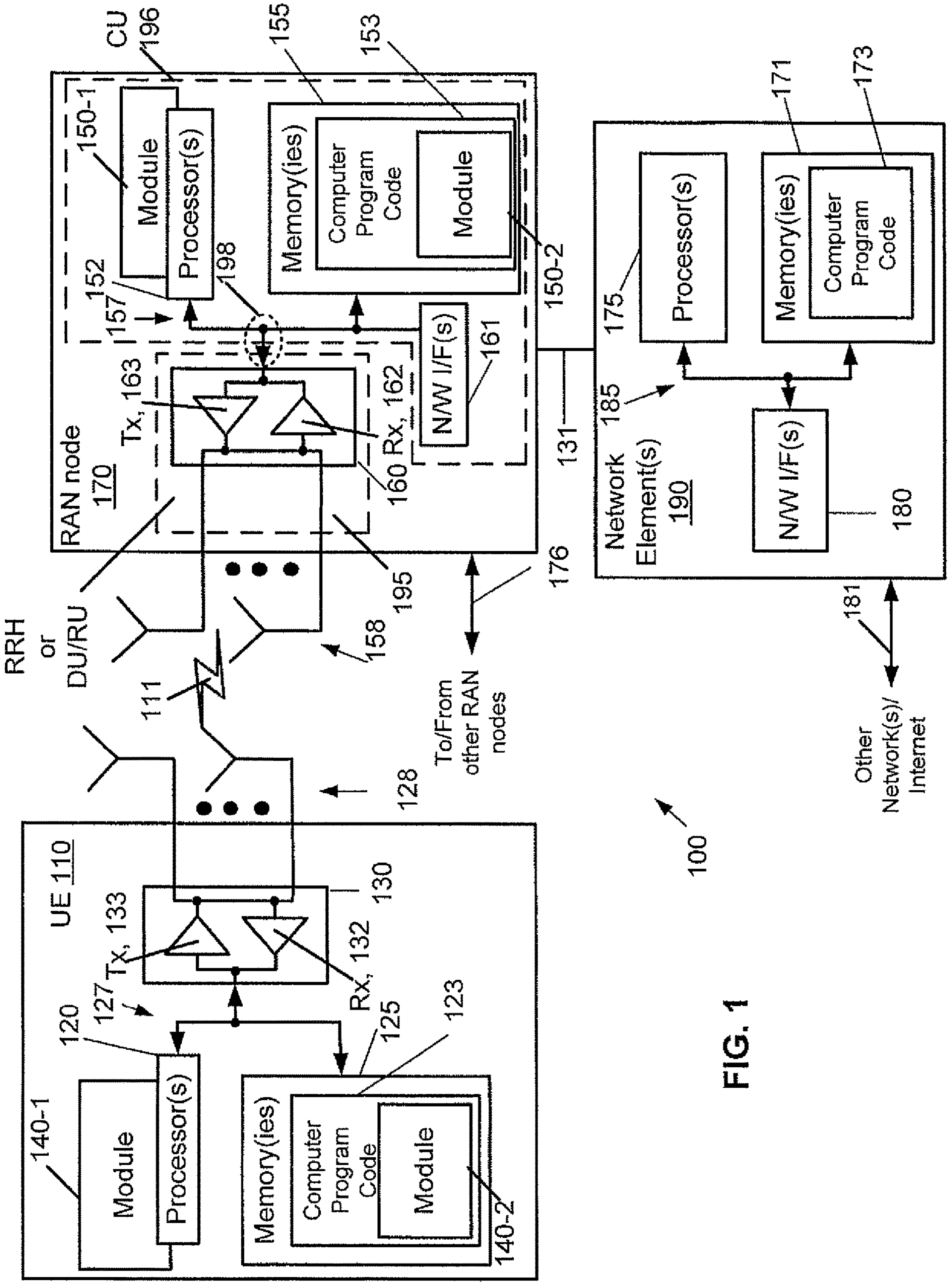
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
6G sixth generation
AMF access and mobility management function
BBP baseband processor
CRAN cloud radio access network
CU central unit
CWUS conditional wake-up signal
D2D device-to-device
DRX discontinuous reception
DU distributed unit
EH energy harvesting
eMTC enhanced machine type communication
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
IoT Internet of Things
L1 layer 1
LTE long term evolution
MAC medium access control
MME mobility management entity
mMTC massive machine-type communications
NB-IOT narrow band Internet of Things
ng or NG new generation
ng-eNB or NG-eNB new generation eNB
NM new modem
NR new radio
N/W or NW network
O-RAN open radio access network
PDCCH physical downlink control channel
PDCP packet data convergence protocol
PDSCH physical downlink shared channel
PDWCH physical downlink wake-up channel
PHY physical layer
ProSe proximity service
PSS primary synchronization signal
QOS quality of service
RA random access
RAN radio access network
RedCap reduced capability
RF radio frequency
RFID radio-frequency identification
RLC radio link control
RRC radio resource control
RRH remote radio head
RS reference signal
RU radio unit
Rx receiver
SDAP service data adaptation protocol
SGW serving gateway
SL sidelink
SMF session management function
SSS secondary synchronization signal
Tx transmitter
UE user equipment (e.g., a wireless, typically mobile device)
UPF user plane function
V2I vehicles to infrastructure
V2N vehicles to network
V2P vehicles to pedestrian
V2V vehicle to vehicle
V2X vehicle-to-everything
VNR virtualized network function
w-cycle wake-up cycle
WI wake-up indicator
WRx or WURx wake-up receiver
WU wake-up
WUS wake-up signal Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. Various embodiments of the user equipment 110 can also include, but are not limited to, sensors having wired or wireless communication capabilities, devices integrated into vehicles, infrastructure associated with vehicular travel, wearable devices used by pedestrians or other non-vehicular users of roads, user equipment unrelated to traffic users, public safety user equipment and/or other commercial user equipment, user equipment configured to participate in sidelink scenarios, such as public safety user equipment and/or other commercial user equipment, sensors having wired or wireless communication capabilities, Internet of Things (IOT) devices, ambient IoT devices, devices capable of receiving information from sensors and having wireless communication capabilities, etc.

Having thus introduced one suitable but non-limiting technical context for the practice of the example embodiments of the present disclosure, example embodiments will now be described with greater specificity.

Features as described herein generally relate to energy harvesting (EH) devices, including but not limited to passive/ambient Internet of Things (IOT) devices, reduced capability (RedCap) devices, narrow-band IoT devices, cellular IoT devices, and massive machine-type communications (mMTC). In contrast to battery-powered devices, EH devices collect their energy from the environment, by means of solar cells, mechanical generators, radiofrequency harvesters, etc. Since the battery charge may decrease and increase randomly over time, long-term operation may not be as critical as for charge-decreasing, battery-powered devices (i.e. non-EH devices). Instead, energy-harvesting devices may struggle at collecting/harvesting/saving enough energy for short active periods, even though they may eventually recover from full battery drainage. An EH device may also be referred to as a device having an energy constraint, i.e. an energy-constrained device. An energy-constrained device, such as a UE, may be an energy harvesting UE, or a UE with a low battery capacity, or a passive UE with no battery that works with, for example, backscattering. The energy constraint may be UE battery level, capacity, harvesting capacity, backscattering capability, etc. Energy harvesting could be considered in several use cases by which a UE can harvest and store a limited amount of energy (e.g. using light, radio frequency (RF), vibration, etc.) when available.

Particularly, sensors powered by solar energy are getting popular, especially for the tiny sensors deployed outdoors for monitoring. The maximum Tx power of these passive IoT devices may also be significantly smaller due to smaller battery size or the absence of a battery. Generally, they are used for delay-tolerant IoT-types of traffic (e.g. reporting temperature, traffic conditions, etc.).

Features as described herein may relate to redcap devices, which may be enabled to send messages with low latency and high reliability and/or may have reduced capabilities such as: bandwidth (BW) of 20 MHz for frequency range 1 (FR1), BW of 50 or 100 MHz for frequency range 2 (FR2), reduced number of antennas (e.g. 1Tx antenna, 1 or 2 Rx antenna depending on FR and band), limited peak data rates, restricted modulation levels (e.g. 64 quadrature amplitude modulation (QAM) in downlink (DL) and 16-QAM in uplink (UL)) and/or optional half-duplex frequency division duplex (FDD). RedCap devices may include devices with relatively low complexity, cost, and/or size. Use cases for RedCap UE may include industrial Internet of Things (IoT) sensors, wearables, and/or devices used for transportation, tracking, infrastructure, agriculture, smart cities, industrial Internet of Things (IOT) sensors, wireless sensors, video surveillance devices, Internet of Things (IOT) devices, etc. Wearables may include sensors in contact with or near skin, smart fabric, heart rate monitors, temperature monitors, etc. An important use case for RedCap UE may be for industrial sensors.

Features as described herein may relate to passive IoT devices (e.g. ambient IoT devices). There is a demand for improved coverage (i.e. 30 m indoor and up to 100 m outdoor) and increased device density with ultra-low-cost and power consumption that is not addressed by existing solutions (i.e. radio-frequency identification (RFID) that has coverage up to 10 m). The use of passive IoT devices, i.e. devices that are battery-less or devices that have batteries but don't need battery replacement over the lifetime of the device, are being studied within the 3GPP framework (currently a Rel-19 study item in SA and a potential Rel-19 RAN study item). These devices are expected to have lower complexity, data rate, coverage, cost, and energy consumption than NB-IOT/eMTC. The use cases for passive IoT devices include identification, tracking, monitoring, sensing, logistics and supply chain management, transportation, manufacturing (factory automation), healthcare, energy, agriculture, transportation, smart cities, environment, extreme conditions, hazardous environments (e.g. environments where devices with batteries is not an option), etc.

The design targets of passive IoT devices may include the following: improved link budget compared to existing RFID solutions; frequency bands for global useability; ultra-low-cost; no need for battery charging or replacement (enabling low maintenance long life cycle operation); ultra-low-power (e.g. <100 micro-Watts, to enable operation with back-scattering or energy harvesting); small device size, form-factor; positioning accuracy (e.g. 3-5 m); data rate (e.g. 10-100 kbps); energy source: passive devices, use of back-scattering techniques, semi-passive devices, devices operating with energy harvesting or with a very small battery (e.g. <100 mAh); and/or mobile-originated and mobile-terminated data.

As per 3GPP, the following areas may need enhancement to support passive IoT devices: simplified and adaptive procedures for operation with intermittently available energy and interrupted connections, e.g. random access (RA) procedure, radio resource control (RRC) protocol/RRC states handling; light-weight protocol for ultra-low power consumption; and/or energy-neutral sustainable operation of devices.

Additionally or alternatively, example embodiments of the present disclosure may be applicable to sidelink UEs, for example in a scenario in which a network or cell switches off/on for a UE configured to perform sidelink (SL) operations. NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may relate to Internet of Things (IOT) and automotive industries (e.g., for reduction of accident risk and safer driving experiences). These use cases may include a message exchange among vehicles (V2V), vehicles and pedestrians (V2P), vehicles and infrastructure (V2I), and/or vehicles and networks (V2N), and may be referred to as vehicle-to-everything (V2X). The allocation of V2V resources in cellular, i.e., time and frequency resources, can be either controlled by the cellular network structure or performed autonomously by the individual vehicles (e.g. UE devices thereof). Sidelink may use same or different carrier frequencies or frequency bands than cellular communication.

Features as described herein may relate to wake-up signals (WUS). Currently, UEs need to periodically wake up once per discontinuous reception (DRX) cycle, which may dominate the power consumption. If UEs can wake up only when they are triggered, for example in response to paging, power consumption may be dramatically reduced. This may be achieved by using a wake-up signal to trigger the main radio via a separate receiver that may monitor for wake-up signals with ultra-low power consumption. The power consumption for monitoring wake-up signals may depend on the wake-up signal design and the hardware module of the wake-up receiver used for signal detection and processing.

The main WUS operating principle is that, in every wake-up cycle, called w-cycle, the wake-up receiver (WRx) monitors a set of specified subcarriers for a short duration of time to determine whether it receives a wake-up indicator (WI) or not. Through the WI, the network may inform the UE to decode the physical downlink control channel (PDCCH) with a specified time offset, called w-offset (or $T_{of}$). Once the WRx successfully detects the WI, the baseband processor (BBP) may be switched on. After that, the BBP may decode the PDCCH messages at an active state for a preconfigured on-duration period, followed by the initiation of its inactivity timer. After the inactivity timer is initiated, and if a new PDCCH message is received before the timer expiration, the BBP re-initiates its inactivity timer. However, if there is no PDCCH message received before the expiration of the inactivity timer, a sleep period may start, the UE may switch to its sleep state, and the WRx may operate according to its w-cycle.

Figure 2:
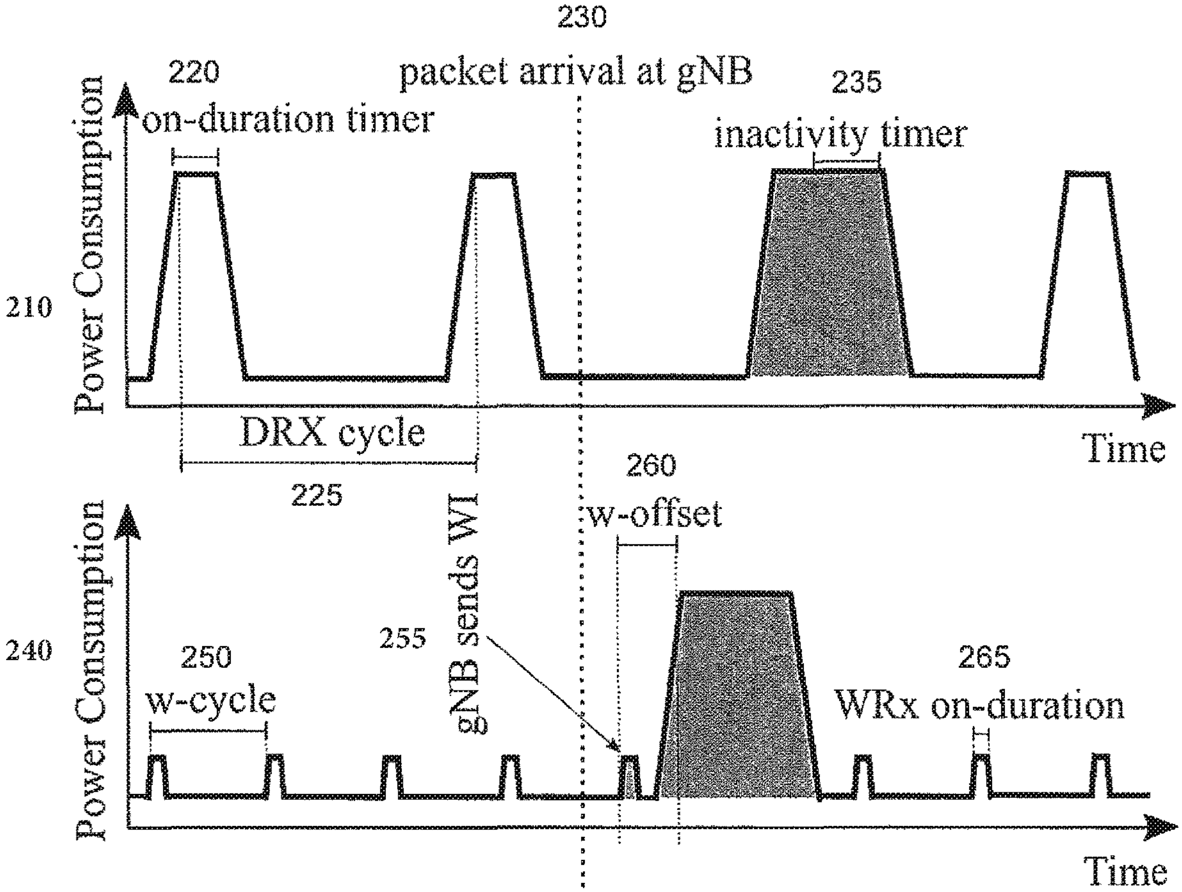
FIG. 2 is a diagram illustrating features as described herein.

Referring now to FIG. 2, illustrated is example power consumption profiles of DRX (210) and WUS (240). Gray areas indicate power consumption under scheduled PDCCH. In the DRX power consumption profile (210), more power is consumed during the on-duration (220) of the DRX cycle (225) than when the device is asleep. After a packet arrives at the gNB (230), the sleep portion of the DRX cycle may be postponed according to the inactivity timer (235), such that power is consumed under scheduled PDCCH. In the WUS power consumption profile (240), a WRx monitors for WI during a WRx on-duration portion (265) of the w-cycle (250). After a packet arrives at the gNB (230), the WRx detects a WI, and based on a w-offset, triggers the main receiver to wake up, such that power is consumed under scheduled PDCCH. It may be noted that the WUS (240) reduces the UE energy consumption compared to baseline DRX (210), as the energy consumption related to decoding unscheduled PDCCHs is avoided. Moreover, since the w-cycle can be short without essentially increasing the energy consumption, the buffering delay can be reduced compared to DRX (210).

RAN has agreed to study item (RP-213645) on low-power Wake-up Signal and Receiver for NR with the following objectives:

"... As opposed to the work on UE power savings in previous releases, this study will not require existing signals to be used as WUS. All WUS solutions identified shall be able to operate in a cell supporting legacy UEs. Solutions should target substantial gains compared to the existing Rel-15/16/17 UE power saving mechanisms. Other aspects such as detection performance, coverage, UE complexity, should be covered by the evaluation.

The study item includes the following objectives:

- Identify evaluation methodology (including the use cases) & KPIs [RAN1]
  - Primarily target low-power WUS/WUR for power-sensitive, small form-factor devices including IoT use cases (such as industrial sensors, controllers) and wearables
    - Other use cases are not precluded
- Study and evaluate low-power wake-up receiver architectures [RAN1, RAN4]
- Study and evaluate wake-up signal designs to support wake-up receivers [RAN1, RAN4]
- Study and evaluate L1 procedures and higher layer protocol changes needed to support the wake-up signals [RAN2, RAN1]

Study potential UE power saving gains compared to the existing Rel-15/16/17 UE power saving mechanisms and their coverage availability, as well as latency impact. System impact, such as network power consumption, coexistence with non-low-power-WUR UEs, and network coverage/capacity/resource overhead should be included in the study [RAN1]

Note: The need for RAN2 evaluation will be triggered by RAN1 when necessary . . . "

Many EH devices intended for IOT applications will only transmit/receive very small amounts of data very rarely (e.g. a few times a day). In such scenarios, the use of WUS or WURx may be the best option. However, there is a need to provide an enhanced WUS procedure for EH devices.

Figure 3:
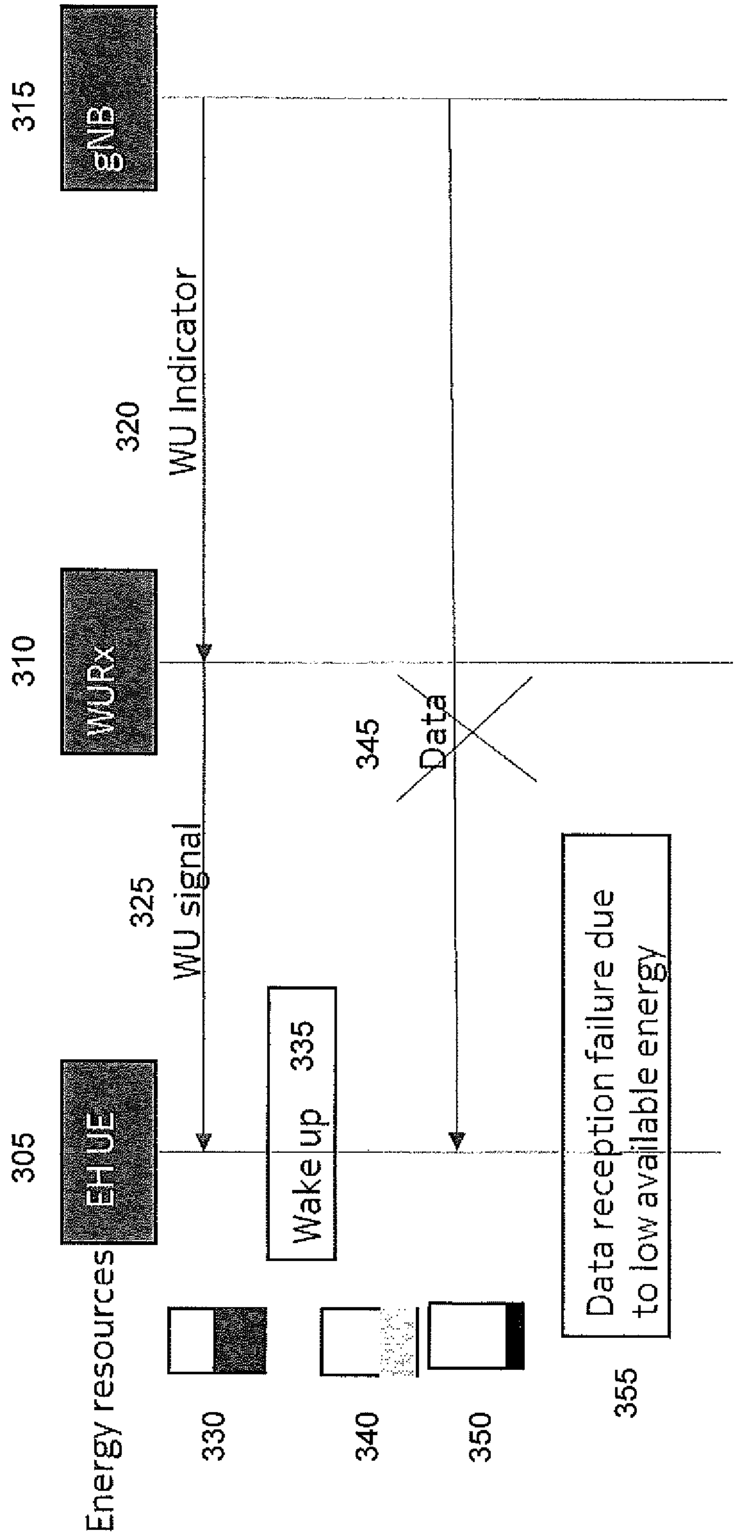
FIG. 3 is a diagram illustrating features as described herein.

Referring now to FIG. 3, illustrated is an example of WUS-based data reception failure. As shown in FIG. 3, the current WUS-based DL data reception procedure might fail in case the energy resources to receive the data are limited. At 320, a WURx (310) may receive, from a gNB (315), a WU indicator. At 325, the WURx (310) may transmit a WU signal to the EH UE (305). At that time, the energy resources of the EH UE (305) may be at a first level (330). At 335, the EH UE (305) may wake up in response to the WU signal (325), and begin using energy, such that its energy resources drop (340).

After the EH UE (305) receives a wake-up indicator equal to one, the gNB (315) may start sending user data and corresponding signaling (PDCCH and PDSCH) to the target UE (305) with a time offset of wake-up scheme ($t_{of}$). But after receiving WUS, or within $t_{of}$, if the UE energy resources drop, for example as at 350, the UE (305) might not be able to receive the DL data correctly (345, 355), causing data reception errors and high UE energy consumption, such that the UE (305) might need to request the same data again.

Example embodiments of the present disclosure may provide a conditional WUS response for EH devices that may be based on UE's harvested energy levels.

Figure 4:
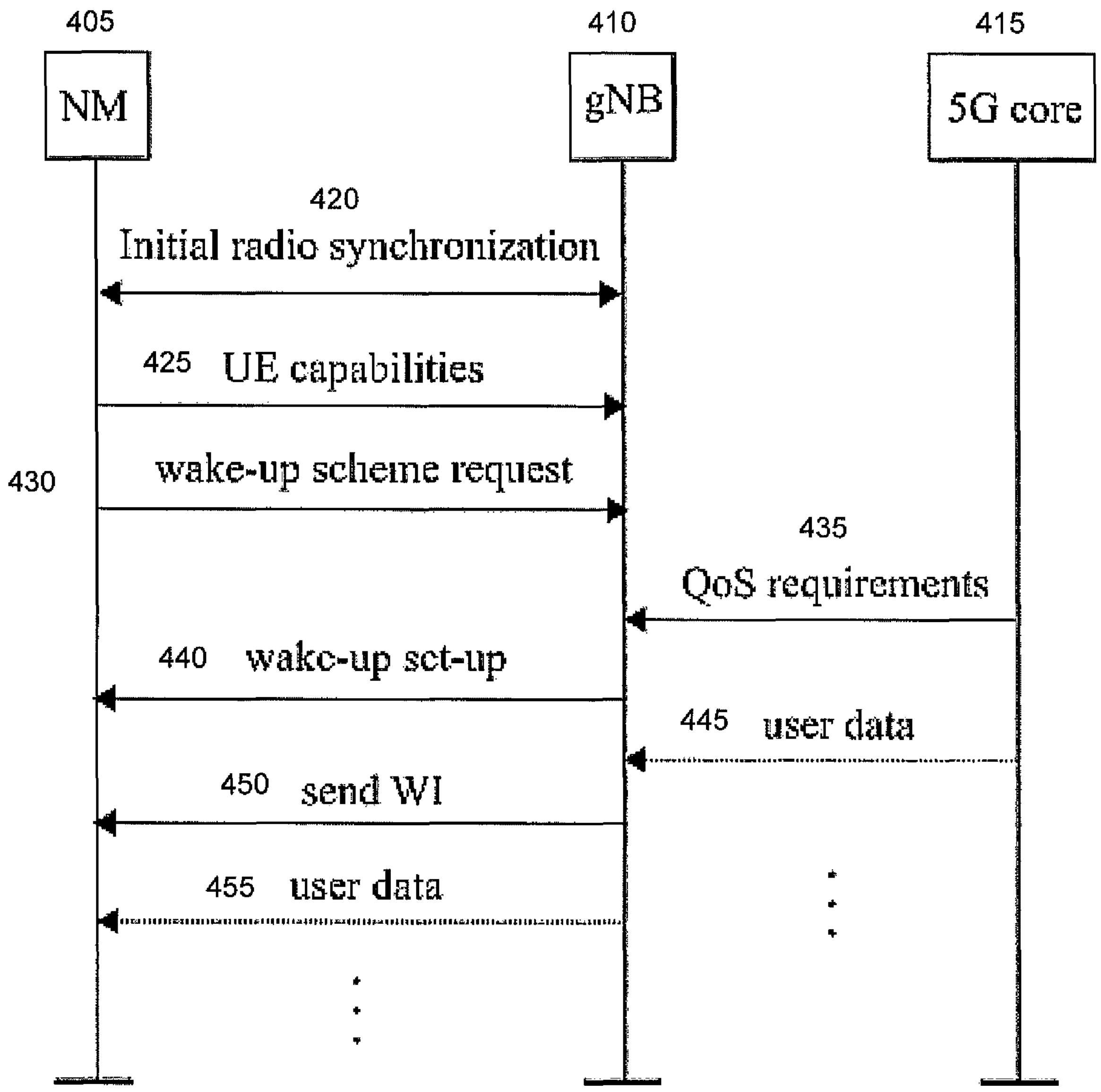
FIG. 4 is a diagram illustrating features as described herein.

FIG. 4 illustrates, in an exemplary manner, basic signaling involved for requesting wake-up as service and the corresponding wake-up scheme parameter setup (see, e.g., S. Rostami, et. al. "Novel Wake-up Scheme for Energy-Efficient Low-Latency Mobile Devices in 5G Networks", IEEE TRANSACTIONS ON MOBILE COMPUTING, VOL. 20, NO. 4, APRIL 2021). FIG. 4 illustrates signaling for the wake-up-based new modem (NM) concept.

At 420, the initial downlink timing synchronization between the NM (405) and the gNB (410) may be required when the NM (405) moves to power-saving mode. At 425, once the NM has acquired the synchronization through the primary synchronization signal (PSS) and secondary synchronization signal (SSS), the NM may signal its capabilities (e.g. start-up time of cellular module ($t_{su}$) and power-down time of cellular module ($t_{pd}$)) to the network (410). At 430, the NM (405) may then send a wake-up scheme request as a service to the gNB (410) and the 5G core network (415). In response, at 435, QoS requirements (e.g. the maximum delay bound) and traffic patterns of ongoing connection may be provided to the gNB (410). At 440, based on QoS requirements and other parameters (e.g. traffic arrival rate, delay bound, power profiles, and start-up/power-down periods), the gNB (410) may configure the wake-up scheme parameters (e.g. inactivity timer (TI), ON-time duration (TON), wake-up cycle ($t_e$), length of Zadoff-Chu sequence (K), time offset of wake-up scheme ($t_{of}$), the physical downlink wake-up channel (PDWCH) group index and the unique cyclic shift within group). Optionally, at 445, the 5G core (415) may transmit, to the gNB (410), user data. At 450, after configuring the wake-up parameters, the gNB (410) may send a wake-up indicator (WI) in pre-known wake-up instants, while the NM (405) may listen to the PDWCH with a period of $t_e$. At 455, once WI equals to one, the gNB may send user data and corresponding signaling (e.g. PDCCH and PDSCH) to the target UE (405) with a timing offset of $t_{of}$.

A technical effect of example embodiments of the present disclosure may be to overcome the DL data reception failure at the energy harvesting UE side due to low energy resources.

In an example embodiment, a conditional wake-up signal (CWUS) scheme for EH devices may be provided, where upon receiving the wake-up indicator and based on the energy resources, the UE may send a CWUS acknowledgment to the gNB. The CWUS acknowledgment signal may indicate, to the gNB, about delaying or continuing DL data transmission to the UE.

In an example embodiment, dynamic control on the wake-up indicator may be provided, where the gNB may stop sending WI when the UE's energy resources are low; the UE may auto-evaluate its energy state every wake-up cycle. A technical effect of example embodiments of the present disclosure may be to achieve further UE power savings. Upon receiving a UE indication of a high energy state (i.e. through CWUS acknowledgment), the gNB may resume sending wake-up indicator(s) to the UE, or the UE's wake-up receiver.

Figure 5:
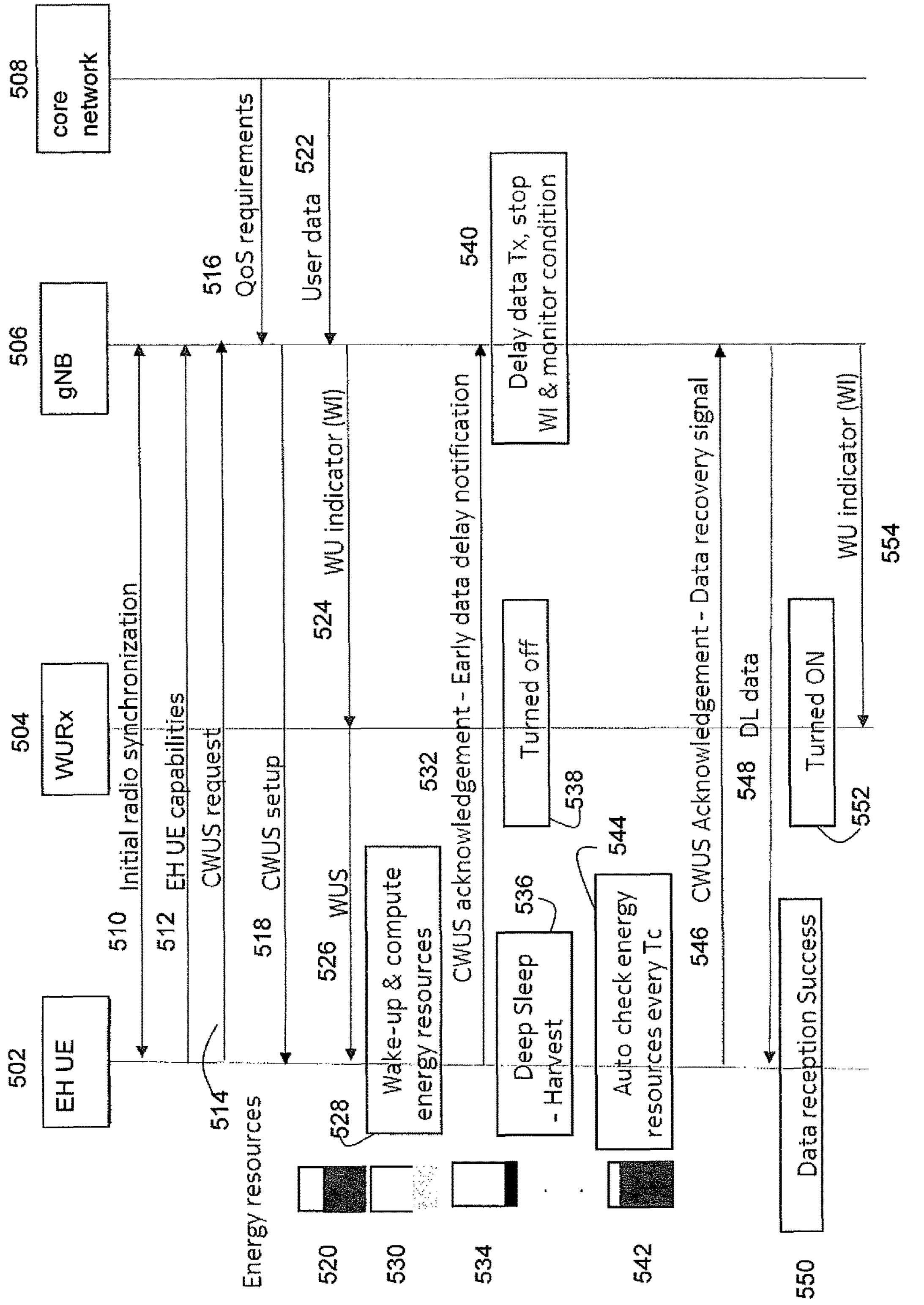
FIG. 5 is a diagram illustrating features as described herein.

Referring now to FIG. 5, illustrated is an example of signaling according to an example embodiment of the present disclosure. While in the example of FIG. 5 the WURx (504) is illustrated as separate from the EH UE (502), the WURx (504) may optionally be part of the EH UE (502). It may be noted that the core network (508) may be a 5G core network, a 6G core network, or any other type of core network.

At 510, the initial downlink timing synchronization may be required when the EH UE (502) moves to a power-saving mode. Once the UE (502) has acquired the synchronization through the primary synchronization signal (PSS) and secondary synchronization signal (SSS), at 512 the UE (502) may signals its capabilities (e.g. EH capability, start-up time of cellular module ($t_{su}$) and power-down time of cellular module ($t_{pd}$)) to the network (506). At 514, UE (502) may send a conditional wake-up signal (CWUS) scheme request as a service to the gNB (506) and core network (508). The condition may involve an energy check before gNB sends the DL data. The energy check may need to be done at the EH UE side (502) within a specified time (T), which may be less than the time offset of wake-up scheme ($t_{of}$). In the CWUS scheme request (514), the UE (502) may specify T to the network so that the gNB (506) may assign $t_{of}$ properly/accordingly. In other words, the CWUS request (514) may include a timer value to evaluate the energy level. The energy check may be based on the energy arrival (e.g. a previous or current rate at which energy is being harvested/obtained) at the UE side (502), stored energy (e.g. energy that is currently held at the UE), and/or predicted energy arrival (e.g. a rate at which energy is expected to be obtained/harvested).

At 516, in response, to the CWUS request (514), QOS requirements (e.g. the maximum delay bound) and traffic patterns of ongoing connection(s) may be provided to the gNB (506) from the core network (508). At 518, based on QoS requirements and other parameters (e.g. traffic arrival rate, delay bound, power profiles, and start-up/power-down periods), the gNB (506) may configure the wake-up scheme parameters (e.g. inactivity timer ($T_I$), ON-time duration ($T_{ON}$), wake-up cycle ($t_c$), length of Zadoff-Chu sequence (K), time offset of wake-up scheme ($t_{of}$), the physical downlink wake-up channel (PDWCH) group index and the unique cyclic shift within group). Here, $t_{of}$ may be computed based on T indicated in the CWUS request (514). The power profiles and/or start-up/power down periods may be EH UE specific. The gNB (506) may transmit one or more of these parameters to the UE (502) for the conditional wake-up signal operation before transmitting WI.

At 522, the core network (508) may provide user data to the gNB (506).

At 524, after configuring the wake-up parameters, the gNB (506) may send a wake-up indicator (WI) in pre-known wake-up instants, while the WURx (hosted at UE side) (504) may listen to the PDWCH with a period of $t_c$. Additionally or alternatively, the gNB (506) may transmit, for the UE (502) (e.g. to the WURx (504)), a wake-up signal, a wake-up signal beacon, a synchronization signal, a signal configured to be measured with a wake-up receiver, or any other signal. A WUS beacon may be used for synchronization purposes (e.g. to keep a wake-up receiver synchronized, and also possibly to keep different "cells" that are transmitting WUS synchronized) and it may be constantly transmitted in WUS beacon occasions (i.e. it may be transmitted even if WUS is not transmitted). WUS may indicate whether the UE shall wakeup for paging monitoring.

Once WI is equal to one, at 526, the WURx (504) may wake up the UE (502). At 528, the UE (502) may wake up and compute the energy resources at the UE side within T. For example the UE (502) may determine a current energy level of the UE (502) within T. For example, the energy resources may be at a first level (520). Waking up may cause energy resources to be used at the UE (502), for example such that the energy resources drop to a second level (530) that is lower than the first level (520). However, this is not limiting; it is possible for the EH UE (502) to harvest energy at any given time. Alternatively, the energy resources may be at a third level (534) that is lower than the first level (520) and the second level (530). More or fewer energy levels may be possible. Additionally or alternatively, the UE (502) may determine whether the current energy level is at, below, or above one or more thresholds, which may be different values.

In an example embodiment, various power states may be associated with an EH UE, during which associated operations may be supported. For example, in State 1, which may be a power saving mode, EH<threshold 1, where EH may be the amount of the harvested energy of the EH device. For example, EH may be seen as the instantaneously available energy harvested/stored at the device (EH_stored). Alternatively, EH may be the expected harvested energy of the device (EH_expected). This threshold condition may determine the sleep state, where the UE may suspend all communication activity and go to sleep. For example, in State 2, threshold 1<EH<threshold 2. When there is a limited amount of harvested energy available for the supported operations, those that require a small amount of energy (e.g. reception of paging, short messages, priority updates, SDT, and/or signaling) may be supported, while other operations may not be supported. For example, in State 3, EH>threshold 2. When EH is above this threshold, more energy-hungry operations may be supported (i.e. transmission or reception of larger amounts of data).

In an example embodiment, a further state differentiation may be supported (e.g. State 4), where State 3 may be used for mobile terminated traffic (i.e. small amount of uplink transmission) and State 4 may be used for mobile generated traffic (i.e. large amount of uplink transmission).

In an example embodiment, the number/types of states may be device type dependent. A technical effect of increasing the number of power states may be to allow more granularity, but more threshold calculations may be needed.

In the example of FIG. 5, the energy resources may be at the third level (534), such that at 532, in case the UE (502) has low energy resources, the EH UE (502) may send a conditional WUS acknowledgment with an indication to delay sending data to the EH UE. Additionally or alternatively, the UE (502) may determine that the current energy level is at or below a threshold, and send a conditional WUS acknowledgment based on this determination. The conditional WUS acknowledgment may be a 1-bit indication where '0' indicates to send DL data and 'l' indicates to delay DL data transmission. Alternatively, it could be a 2-bit indication providing the energy level of the EH device where '00' indicates no energy, '01' low energy, '10' medium energy, and '11' high energy availability at EH UE. These examples of the conditional WUS acknowledgement are not limiting; the information regarding the energy resources of the EH UE (502) may be indicated in another way. Based on the energy level, the gNB (506) may decide to transmit or delay the data.

In an example embodiment, based on an energy indication in conditional acknowledgment, the gNB (506) may send a part of DL data and delay the remaining data until the EH UE (502) gets energized (i.e. computes a higher level of energy resources) and sends an indication that an energy condition (e.g. a threshold) is now satisfied to receive the remaining data.

In an example embodiment, the gNB (506) may prioritize the transmission based on the energy state of the devices (e.g. EH UE(s)). For example, transmissions that are supported by a current energy state of the UE may be prioritized over transmissions that are not supported by the current energy state of the UE. For example, if the UE is in State 2, the gNB may prioritize short messages, priority updates, SDT, and/or control signaling.

After indicating that the energy resources are low, at 536, the UE (502) may go into a deep sleep state to harvest more energy. For example, the UE (502) may go into a sleep state, an inactive state, or an idle state; these terms may be used interchangeably in the present disclosure. At 538, the UE (502) may turn off the WURx (504) for energy-saving purposes. At 540, the gNB (506) may delay the data transmissions, may stop sending WI to the UE (502) (i.e. begin to not send WI, or fail to send WI, or pause the sending of WI), and may monitor the energy condition. As the WURx (504) is hosted on the UE side, sending WI may not be energy-efficient. In an example embodiment, control signals may also be delayed. In an example embodiment, both data transmissions and control signals may be delayed. In an example embodiment, different energy thresholds may be used to cause various types of downlink transmissions to be delayed. For example, if the EH UE (502) determines at 528 that the energy resources are at or below a first threshold but above a second, different threshold, the EH UE (502) may transmit a CWUS acknowledgement that is configured to indicate that DL data should be delayed. If the EH UE (502) determines at 528 that the energy resources are at or below the second threshold, which may be lower than the first threshold, then the EH UE (502) may transmit a CWUS acknowledgement that is configured to indicate that both DL data and control signals should be delayed.

At 544, the EH UE (502) may automatically check its energy resources every $T_e$. For example, after energy harvesting, the energy resources of the EH UE (502) may increase to a fourth level (542), which may be higher than the first level (520), the second level (530), and the third level (534). Additionally or alternatively, the UE (502) may determine that the current energy level is above a first threshold, or is equal to or above a second threshold. The first threshold and the second threshold may be different values. Upon switching to a higher energy state, at 546 the EH UE (502) may provide, to the gNB (506), a CWUS acknowledgment to indicate recovering remaining data (i.e. that the remaining data should be transmitted to the UE (502)). Additionally or alternatively, the CWUS acknowledgement may be based on a determination that the current energy level is at or above a threshold. At 548, the gNB (506) may start sending DL data to the UE (502). At 550, the EH UE (502) may successfully receive complete DL data. At 552, the UE may turn ON its WURx (504). At 554, the gNB (506) may resume WI transmission to the WURx (504).

A person of ordinary skill in the art will understand that one, some, or all of these steps may occur in combination with other steps, or in a different order.

Figure 6:
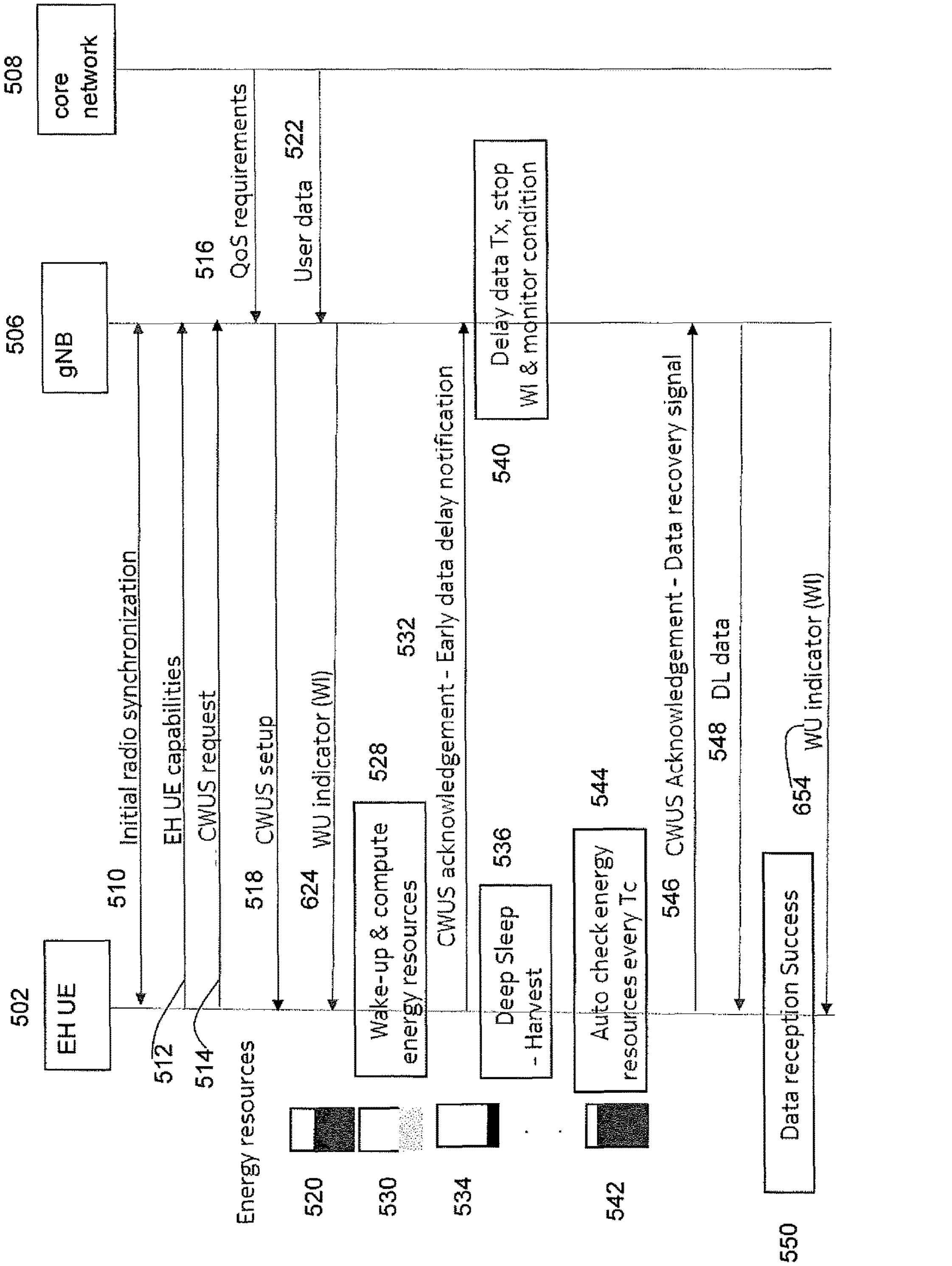
FIG. 6 is a diagram illustrating features as described herein.

Referring now to FIG. 6, illustrated is an example of signaling according to an example embodiment of the present disclosure. FIG. 6 is similar to FIG. 5, except for the absence of a WURx, such that the EH UE is directly receiving the WUS from gNB. Accordingly, portions of FIG. 6 that are similar to FIG. 5 are labeled in the same way, and will not be described again here.

At 624, the gNB (506) may transmit, directly to the UH UE (502), a WU indicator (WI).

At 654, the gNB (506) may transmit, directly to the UH UE (502), a WU indicator (WI).

A person of ordinary skill in the art will understand that one, some, or all of these steps may occur in combination with other steps, or in a different order.

Example embodiments of the present disclosure may be applied to energy harvesting devices (i.e. RedCap and passive IoT) devices.

A technical effect of example embodiments of the present disclosure may be to improve data reception at EH devices based on energy availability. Without application of one or more example embodiments of the present disclosure, the data reception may fail, and the UE may have to receive, again, the same data. A technical effect of example embodiments of the present disclosure may be to ensure that data transmission from the gNB side is delayed until enough energy resources are available at the EH UE side.

A technical effect of example embodiments of the present disclosure may be to enable the gNB to prioritize high-energy UEs transmission.

A technical effect of example embodiments of the present disclosure may be to provide a dynamic control on the wake-up indicator transmitted from the gNB side.

A technical effect of example embodiments of the present disclosure may be to save UE power.

Figure 7:
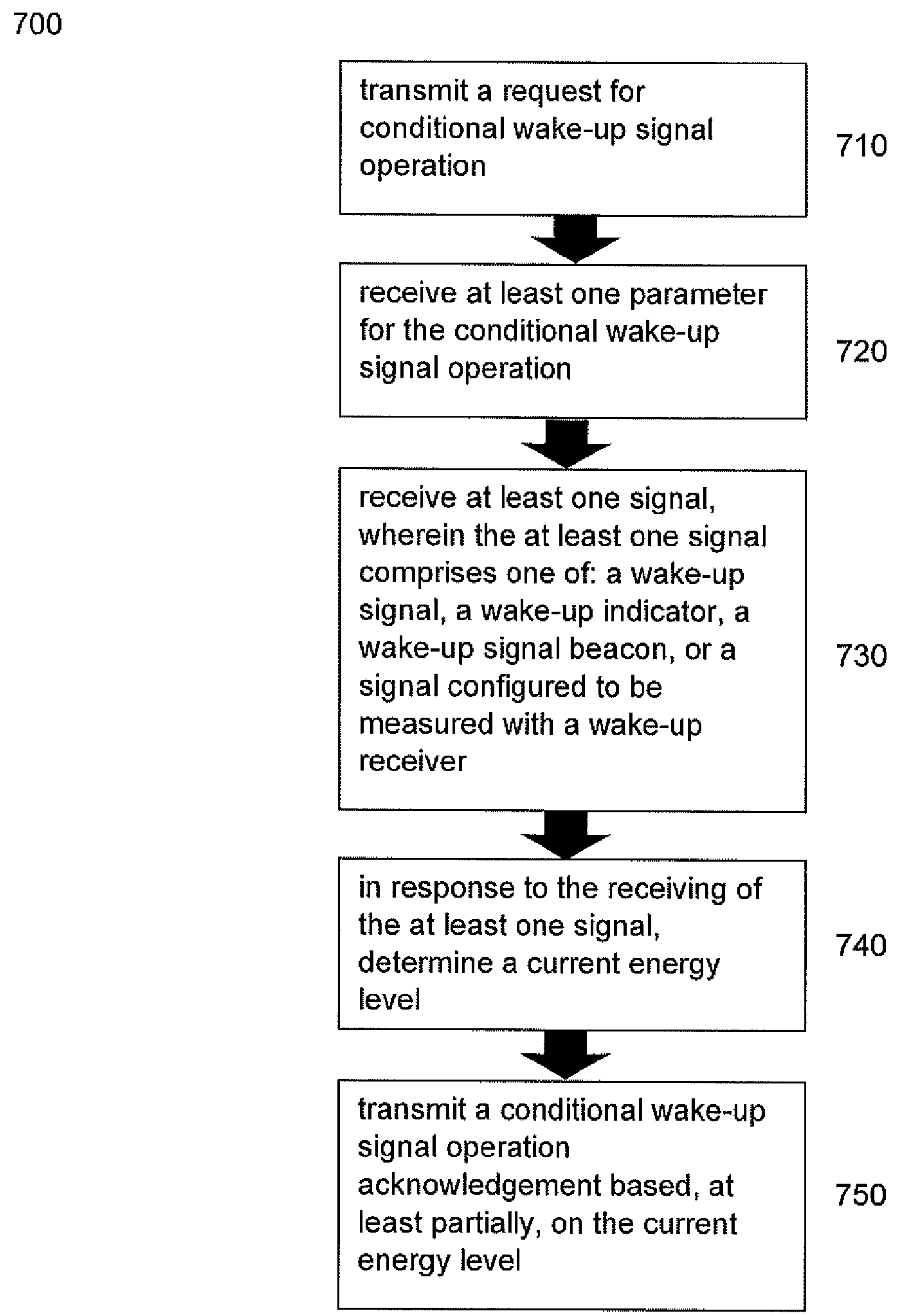
FIG. 7 is a flowchart illustrating steps as described herein.

FIG. 7 illustrates the potential steps of an example method 700. The example method 700 may include: transmitting a request for conditional wake-up signal operation, 710; receiving at least one parameter for the conditional wake-up signal operation, 720; receiving at least one signal, wherein the at least one signal comprises one of: a wake-up signal, a wake-up indicator, a wake-up signal beacon, or a signal configured to be measured with a wake-up receiver, 730; in response to the receiving of the at least one signal, determining a current energy level, 740; and transmitting a conditional wake-up signal operation acknowledgement based, at least partially, on the current energy level, 750. The example method 700 may be performed, for example, with a UE, such as an EH UE.

Figure 8:
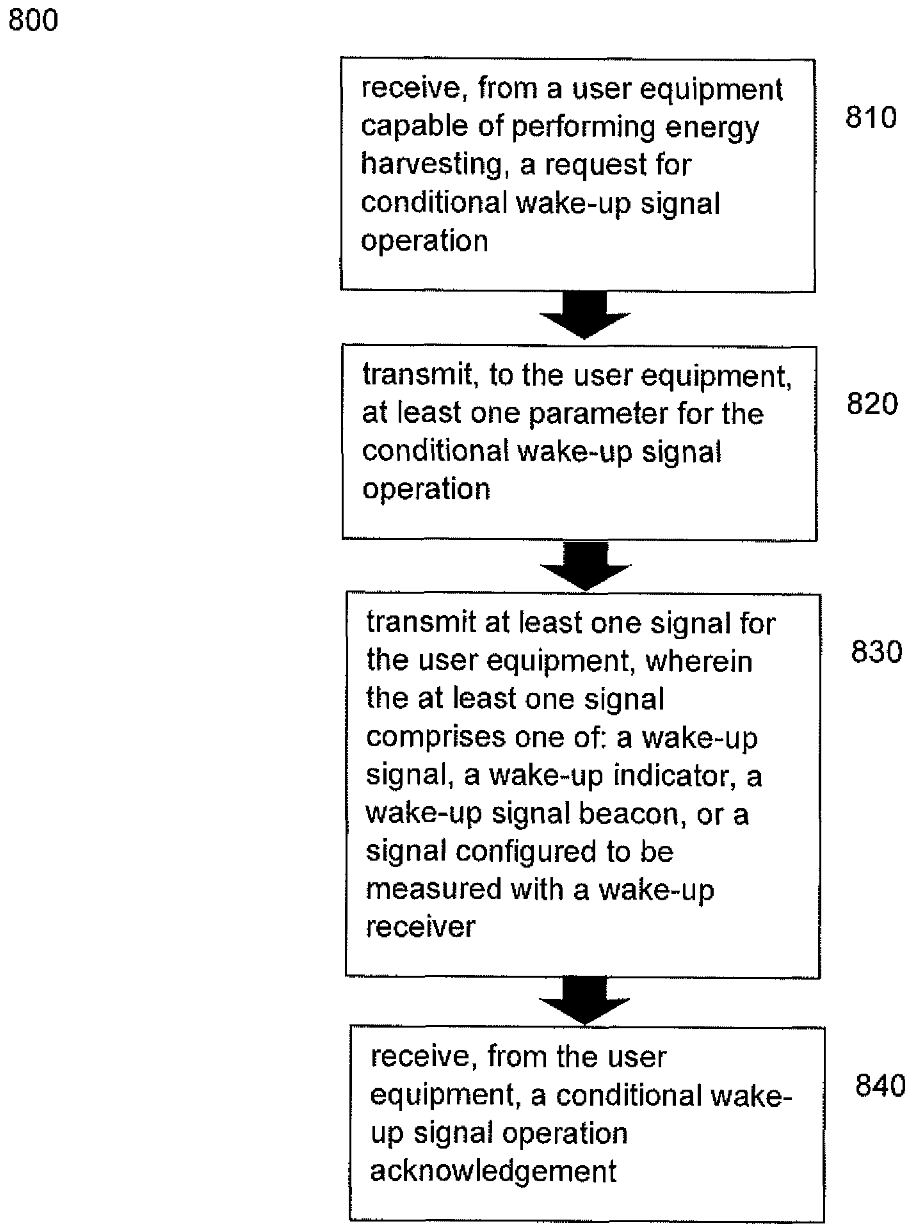
FIG. 8 is a flowchart illustrating steps as described herein.

FIG. 8 illustrates the potential steps of an example method 800. The example method 800 may include: receiving, from a user equipment capable of performing energy harvesting, a request for conditional wake-up signal operation, 810; transmitting, to the user equipment, at least one parameter for the conditional wake-up signal operation, 820; transmitting at least one signal for the user equipment, wherein the at least one signal comprises one of: a wake-up signal, a wake-up indicator, a wake-up signal beacon, or a signal configured to be measured with a wake-up receiver, 830; and receiving, from the user equipment, a conditional wake-up signal operation acknowledgement, 840. The example method 800 may be performed, for example, with a base station.

In accordance with one example embodiment, an apparatus may comprise: at least one processor; and at least one memory storing instructions that, when executed by the at least one processor, cause the apparatus at least to: transmit a request for conditional wake-up signal operation; receive at least one parameter for the conditional wake-up signal operation; receive at least one signal, wherein the at least one signal may comprise one of: a wake-up signal, a wake-up indicator, a wake-up signal beacon, or a signal configured to be measured with a wake-up receiver; in response to the receiving of the at least one signal, determine a current energy level; and transmit a conditional wake-up signal operation acknowledgement based, at least partially, on the current energy level.

The example apparatus may comprise at least one of: an energy harvesting device, a reduced capability device, a cellular Internet of Things device, a narrow-band Internet of Things device, or an ambient Internet of Things device.

The request for the conditional wake-up signal operation may comprise, at least, a time period for the determining of the current energy level.

The example apparatus may be further configured to: determine the time period for the determining of the current energy level based, at least partially, on at least one of: a previous rate of energy arrival at the apparatus, a current rate of energy arrival at the apparatus, stored energy at the apparatus, or a predicted rate of energy arrival at the apparatus.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The wake-up indicator may be received during a wake-up cycle via a physical downlink wake-up channel.

The at least one signal may be received from one of: a base station, or a wake-up receiver.

The example apparatus may be further configured to: in response to the at least one received signal, transition from a sleep state to an awake state.

The conditional wake-up signal operation acknowledgement may comprise an indication of the current energy level.

Transmitting the conditional wake-up signal operation acknowledgement may comprise the example apparatus being further configured to: in response to the current energy level being at or below at least one first threshold, transmit an indication to delay one or more downlink transmissions; transition to a sleep state; and perform energy harvesting during the sleep state.

The example apparatus may be further configured to: periodically determine the current energy level, during the sleep state and based on a wake-up cycle time period, until the current energy level is at or above at least one second threshold.

The example apparatus may be further configured to: cause the wake-up receiver to be turned off in response to the current energy level being at or below the at least one first threshold.

Transmitting the conditional wake-up signal operation acknowledgement may comprise the example apparatus being further configured to: in response to the current energy level being at or above at least one threshold, transmit an indication to continue with at least one downlink transmission.

The example apparatus may be further configured to: cause the wake-up receiver to be turned on in response to the current energy level being at or above the at least one threshold.

In accordance with one aspect, an example method may be provided comprising: transmitting, with a user equipment, a request for conditional wake-up signal operation; receiving at least one parameter for the conditional wake-up signal operation; receiving at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and transmitting a conditional wake-up signal operation acknowledgement based, at least partially, on the current energy level.

The user equipment may comprise at least one of: an energy harvesting device, a reduced capability device, a cellular Internet of Things device, a narrow-band Internet of Things device, or an ambient Internet of Things device.

The request for the conditional wake-up signal operation may comprise, at least, a time period for the determining of the current energy level.

The example method may further comprise: determining the time period for the determining of the current energy level based, at least partially, on at least one of: a previous rate of energy arrival at the user equipment, a current rate of energy arrival at the user equipment, stored energy at the user equipment, or a predicted rate of energy arrival at the user equipment.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The wake-up indicator may be received during a wake-up cycle via a physical downlink wake-up channel.

The at least one signal may be received from one of: a base station, or a wake-up receiver.

The example method may further comprise: in response to the at least one received signal, transitioning the user equipment from a sleep state to an awake state.

The conditional wake-up signal operation acknowledgement may comprise an indication of the current energy level.

The transmitting of the conditional wake-up signal operation acknowledgement may comprise: in response to the current energy level being at or below at least one first threshold, transmitting an indication to delay one or more downlink transmissions; transitioning the user equipment to a sleep state; and performing energy harvesting, with the user equipment, during the sleep state.

The example method may further comprise: periodically determining the current energy level, during the sleep state and based on a wake-up cycle time period, until the current energy level is at or above at least one second threshold.

The example method may further comprise: causing the wake-up receiver to be turned off in response to the current energy level being at or below the at least one first threshold.

The transmitting of the conditional wake-up signal operation acknowledgement may comprise: in response to the current energy level being at or above at least one threshold, transmitting an indication to continue with at least one downlink transmission.

The example method may further comprise: causing the wake-up receiver to be turned on in response to the current energy level being at or above the at least one threshold.

In accordance with one example embodiment, an apparatus may comprise: circuitry configured to perform: transmitting, with a user equipment, a request for conditional wake-up signal operation; circuitry configured to perform: receiving at least one parameter for the conditional wake-up signal operation; circuitry configured to perform: receiving at least one signal, wherein the at least one signal may comprise one of: a wake-up signal, a wake-up indicator, a wake-up signal beacon, or a signal configured to be measured with a wake-up receiver; circuitry configured to perform: in response to the receiving of the at least one signal, determining a current energy level; and circuitry configured to perform: transmitting a conditional wake-up signal operation acknowledgement based, at least partially, on the current energy level.

In accordance with one example embodiment, an apparatus may comprise: processing circuitry; memory circuitry including computer program code, the memory circuitry and the computer program code configured to, with the processing circuitry, enable the apparatus to: transmit a request for conditional wake-up signal operation; receive at least one parameter for the conditional wake-up signal operation; receive at least one signal, wherein the at least one signal may comprise one of: a wake-up signal, a wake-up indicator, a wake-up signal beacon, or a signal configured to be measured with a wake-up receiver; in response to the receiving of the at least one signal, determine a current energy level; and transmit a conditional wake-up signal operation acknowledgement based, at least partially, on the current energy level.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: transmitting a request for conditional wake-up signal operation; receiving at least one parameter for the conditional wake-up signal operation; receiving at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and transmitting a conditional wake-up signal operation acknowledgement based, at least partially, on the current energy level.

The example apparatus may comprise at least one of: an energy harvesting device, a reduced capability device, a cellular Internet of Things device, a narrow-band Internet of Things device, or an ambient Internet of Things device.

The request for the conditional wake-up signal operation may comprise, at least, a time period for the determining of the current energy level.

The means may be further configured to perform: determining the time period for the determining of the current energy level based, at least partially, on at least one of: a previous rate of energy arrival at the apparatus, a current rate of energy arrival at the apparatus, stored energy at the apparatus, or a predicted rate of energy arrival at the apparatus.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The wake-up indicator may be received during a wake-up cycle via a physical downlink wake-up channel.

The at least one signal may be received from one of: a base station, or a wake-up receiver.

The means may be further configured to perform: in response to the at least one received signal, transitioning from a sleep state to an awake state.

The conditional wake-up signal operation acknowledgement may comprise an indication of the current energy level.

The means configured to perform transmitting the conditional wake-up signal operation acknowledgement may comprise means configured to perform: in response to the current energy level being at or below at least one first threshold, transmitting an indication to delay one or more downlink transmissions; transitioning to a sleep state; and performing energy harvesting during the sleep state.

The means may be further configured to perform: periodically determining the current energy level, during the sleep state and based on a wake-up cycle time period, until the current energy level is at or above at least one second threshold.

The means may be further configured to perform: causing the wake-up receiver to be turned off in response to the current energy level being at or below the at least one first threshold.

The means configured to perform transmitting the conditional wake-up signal operation acknowledgement may comprise means configured to perform: in response to the current energy level being at or above at least one threshold, transmitting an indication to continue with at least one downlink transmission.

The means may be further configured to perform: causing the wake-up receiver to be turned on in response to the current energy level being at or above the at least one threshold.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause transmitting of a request for conditional wake-up signal operation; cause receiving of at least one parameter for the conditional wake-up signal operation; cause receiving of at least one signal, wherein the at least one signal may comprise one of: a wake-up signal, a wake-up indicator, a wake-up signal beacon, or a signal configured to be measured with a wake-up receiver; in response to the receiving of the at least one signal, determine a current energy level; and cause transmitting of a conditional wake-up signal operation acknowledgement based, at least partially, on the current energy level.

In accordance with one example embodiment, a non-transitory computer-readable medium comprising program instructions stored thereon for performing at least the following: causing transmitting of a request for conditional wake-up signal operation; causing receiving of at least one parameter for the conditional wake-up signal operation; causing receiving of at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and causing transmitting of a conditional wake-up signal operation acknowledgement based, at least partially, on the current energy level.

In accordance with another example embodiment, a non-transitory program storage device readable by a machine may be provided, tangibly embodying instructions executable by the machine for performing operations, the operations comprising: causing transmitting of a request for conditional wake-up signal operation; causing receiving of at least one parameter for the conditional wake-up signal operation; causing receiving of at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and causing transmitting of a conditional wake-up signal operation acknowledgement based, at least partially, on the current energy level.

In accordance with another example embodiment, a non-transitory computer-readable medium comprising instructions that, when executed by an apparatus, cause the apparatus to perform at least the following: causing transmitting of a request for conditional wake-up signal operation; causing receiving of at least one parameter for the conditional wake-up signal operation; causing receiving of at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and causing transmitting of a conditional wake-up signal operation acknowledgement based, at least partially, on the current energy level.

A computer implemented system comprising: at least one processor and at least one non-transitory memory storing instructions that, when executed by the at least one processor, cause the system at least to perform: causing transmitting of a request for conditional wake-up signal operation; causing receiving of at least one parameter for the conditional wake-up signal operation; causing receiving of at least one signal, wherein the at least one signal may comprise one of: a wake-up signal, a wake-up indicator, a wake-up signal beacon, or a signal configured to be measured with a wake-up receiver; in response to the receiving of the at least one signal, determining a current energy level; and causing transmitting of a conditional wake-up signal operation acknowledgement based, at least partially, on the current energy level.

A computer implemented system comprising: means for causing transmitting of a request for conditional wake-up signal operation; means for causing receiving of at least one parameter for the conditional wake-up signal operation; means for causing receiving of at least one signal, wherein the at least one signal may comprise one of: a wake-up signal, a wake-up indicator, a wake-up signal beacon, or a signal configured to be measured with a wake-up receiver; means for, in response to the receiving of the at least one signal, determining a current energy level; and means for causing transmitting of a conditional wake-up signal operation acknowledgement based, at least partially, on the current energy level.

In accordance with one example embodiment, an apparatus may comprise: at least one processor; and at least one memory storing instructions that, when executed by the at least one processor, cause the apparatus at least to: receive, from a user equipment capable of performing energy harvesting, a request for conditional wake-up signal operation; transmit, to the user equipment, at least one parameter for the conditional wake-up signal operation; transmit at least one signal for the user equipment, wherein the at least one signal may comprise one of: a wake-up signal, a wake-up indicator, a wake-up signal beacon, or a signal configured to be measured with a wake-up receiver; and receive, from the user equipment, a conditional wake-up signal operation acknowledgement.

The request for the conditional wake-up signal operation may comprise, at least, a time period for determining of a current energy level of the user equipment.

The example apparatus may be further configured to: determine a time offset of the conditional wake-up signal operation based, at least partially, on the indicated time period; and monitor for another conditional wake-up signal operation acknowledgement based, at least partially, on the determined time offset.

The example apparatus may be further configured to: determine the at least one parameter for the conditional wake-up signal operation based, at least partially, on at least one of: one or more quality of service requirements, a maximum delay bound, one or more ongoing network traffic patterns, a traffic arrival rate, a delay bound, one or more power profiles, a start-up time period, or a power-down time period.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The at least one signal may be transmitted to one of: the user equipment, or the wake-up receiver.

The conditional wake-up signal operation acknowledgement may comprise an indication of a current energy level of the user equipment.

The example apparatus may be further configured to: determine whether to delay or continue one or more downlink transmissions to the user equipment.

The example apparatus may be further configured to: prioritize at least one downlink transmission based, at least partially, on the current energy level of the user equipment.

The conditional wake-up signal operation acknowledgement may comprise an indication to delay one or more downlink transmissions.

The example apparatus may be further configured to: stop transmitting the at least one signal.

The example apparatus may be further configured to: determine to transmit a first part of a downlink data transmission to the user equipment and delay transmission of a second part of the downlink data transmission until another conditional wake-up signal operation acknowledgement is received.

The conditional wake-up signal operation acknowledgement may comprise an indication to continue with at least one downlink transmission.

In accordance with one aspect, an example method may be provided comprising: receiving, with a base station from a user equipment capable of performing energy harvesting, a request for conditional wake-up signal operation; transmitting, to the user equipment, at least one parameter for the conditional wake-up signal operation; transmitting at least one signal for the user equipment, wherein the at least one signal may comprise one of: a wake-up signal, a wake-up indicator, a wake-up signal beacon, or a signal configured to be measured with a wake-up receiver; and receiving, from the user equipment, a conditional wake-up signal operation acknowledgement.

The request for the conditional wake-up signal operation may comprise, at least, a time period for determining of a current energy level of the user equipment.

The example method may further comprise: determining a time offset of the conditional wake-up signal operation based, at least partially, on the indicated time period; and monitoring for another conditional wake-up signal operation acknowledgement based, at least partially, on the determined time offset.

The example method may further comprise: determining the at least one parameter for the conditional wake-up signal operation based, at least partially, on at least one of: one or more quality of service requirements, a maximum delay bound, one or more ongoing network traffic patterns, a traffic arrival rate, a delay bound, one or more power profiles, a start-up time period, or a power-down time period.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The at least one signal may be transmitted to one of: the user equipment, or the wake-up receiver.

The conditional wake-up signal operation acknowledgement may comprise an indication of a current energy level of the user equipment.

The example method may further comprise: determining whether to delay or continue one or more downlink transmissions to the user equipment.

The example method may further comprise: prioritizing at least one downlink transmission based, at least partially, on the current energy level of the user equipment.

The conditional wake-up signal operation acknowledgement may comprise an indication to delay one or more downlink transmissions.

The example method may further comprise: stopping transmitting of the at least one signal.

The example method may further comprise: determining to transmit a first part of a downlink data transmission to the user equipment and delay transmission of a second part of the downlink data transmission until another conditional wake-up signal operation acknowledgement is received.

The conditional wake-up signal operation acknowledgement may comprise an indication to continue with at least one downlink transmission.

In accordance with one example embodiment, an apparatus may comprise: circuitry configured to perform: receiving, with a base station from a user equipment capable of performing energy harvesting, a request for conditional wake-up signal operation; circuitry configured to perform: transmitting, to the user equipment, at least one parameter for the conditional wake-up signal operation; circuitry configured to perform: transmitting at least one signal for the user equipment, wherein the at least one signal may comprise one of: a wake-up signal, a wake-up indicator, a wake-up signal beacon, or a signal configured to be measured with a wake-up receiver; and circuitry configured to perform: receiving, from the user equipment, a conditional wake-up signal operation acknowledgement.

In accordance with one example embodiment, an apparatus may comprise: processing circuitry; memory circuitry including computer program code, the memory circuitry and the computer program code configured to, with the processing circuitry, enable the apparatus to: receive, from a user equipment capable of performing energy harvesting, a request for conditional wake-up signal operation; transmit, to the user equipment, at least one parameter for the conditional wake-up signal operation; transmit at least one signal for the user equipment, wherein the at least one signal may comprise one of: a wake-up signal, a wake-up indicator, a wake-up signal beacon, or a signal configured to be measured with a wake-up receiver; and receive, from the user equipment, a conditional wake-up signal operation acknowledgement.

In accordance with one example embodiment, an apparatus may comprise means for performing: receiving, from a user equipment capable of performing energy harvesting, a request for conditional wake-up signal operation; transmitting, to the user equipment, at least one parameter for the conditional wake-up signal operation; transmitting at least one signal for the user equipment, wherein the at least one signal may comprise one of: a wake-up signal, a wake-up indicator, a wake-up signal beacon, or a signal configured to be measured with a wake-up receiver; and receiving, from the user equipment, a conditional wake-up signal operation acknowledgement.

The request for the conditional wake-up signal operation may comprise, at least, a time period for determining of a current energy level of the user equipment.

The means may be further configured to perform: determining a time offset of the conditional wake-up signal operation based, at least partially, on the indicated time period; and monitoring for another conditional wake-up signal operation acknowledgement based, at least partially, on the determined time offset.

The means may be further configured to perform: determining the at least one parameter for the conditional wake-up signal operation based, at least partially, on at least one of: one or more quality of service requirements, a maximum delay bound, one or more ongoing network traffic patterns, a traffic arrival rate, a delay bound, one or more power profiles, a start-up time period, or a power-down time period.

The at least one parameter for the conditional wake-up signal operation may comprise at least one of: an inactivity time, a duration of on-time, a wake-up cycle length, a length of a Zadoff-Chu sequence, a time offset for the conditional wake-up signal operation, a group index for a physical downlink wake-up channel, or a cyclic shift within a group for the physical downlink wake-up channel.

The at least one signal may be transmitted to one of: the user equipment, or the wake-up receiver.

The conditional wake-up signal operation acknowledgement may comprise an indication of a current energy level of the user equipment.

The means may be further configured to perform: determining whether to delay or continue one or more downlink transmissions to the user equipment.

The means may be further configured to perform: prioritizing at least one downlink transmission based, at least partially, on the current energy level of the user equipment.

The conditional wake-up signal operation acknowledgement may comprise an indication to delay one or more downlink transmissions.

The means may be further configured to perform: stopping transmitting of the at least one signal.

The means may be further configured to perform: determining to transmit a first part of a downlink data transmission to the user equipment and delay transmission of a second part of the downlink data transmission until another conditional wake-up signal operation acknowledgement is received.

The conditional wake-up signal operation acknowledgement may comprise an indication to continue with at least one downlink transmission.

In accordance with one example embodiment, a non-transitory computer-readable medium comprising instructions stored thereon which, when executed with at least one processor, cause the at least one processor to: cause receiving, from a user equipment capable of performing energy harvesting, of a request for conditional wake-up signal operation; cause transmitting, to the user equipment, of at least one parameter for the conditional wake-up signal operation; cause transmitting of at least one signal for the user equipment, wherein the at least one signal may comprise one of: a wake-up signal, a wake-up indicator, a wake-up signal beacon, or a signal configured to be measured with a wake-up receiver; and cause receiving, from the user equipment, of a conditional wake-up signal operation acknowledgement.

In accordance with one example embodiment, a non-transitory computer-readable medium comprising program instructions stored thereon for performing at least the following: causing receiving, from a user equipment capable of performing energy harvesting, of a request for conditional wake-up signal operation; causing transmitting, to the user equipment, of at least one parameter for the conditional wake-up signal operation; causing transmitting of at least one signal for the user equipment, wherein the at least one signal may comprise one of: a wake-up signal, a wake-up indicator, a wake-up signal beacon, or a signal configured to be measured with a wake-up receiver; and causing receiving, from the user equipment, of a conditional wake-up signal operation acknowledgement.

In accordance with another example embodiment, a non-transitory program storage device readable by a machine may be provided, tangibly embodying instructions executable by the machine for performing operations, the operations comprising: causing receiving, from a user equipment capable of performing energy harvesting, of a request for conditional wake-up signal operation; causing transmitting, to the user equipment, of at least one parameter for the conditional wake-up signal operation; causing transmitting of at least one signal for the user equipment, wherein the at least one signal may comprise one of: a wake-up signal, a wake-up indicator, a wake-up signal beacon, or a signal configured to be measured with a wake-up receiver; and causing receiving, from the user equipment, of a conditional wake-up signal operation acknowledgement.

In accordance with another example embodiment, a non-transitory computer-readable medium comprising instructions that, when executed by an apparatus, cause the apparatus to perform at least the following: causing receiving, from a user equipment capable of performing energy harvesting, of a request for conditional wake-up signal operation; causing transmitting, to the user equipment, of at least one parameter for the conditional wake-up signal operation; causing transmitting of at least one signal for the user equipment, wherein the at least one signal may comprise one of: a wake-up signal, a wake-up indicator, a wake-up signal beacon, or a signal configured to be measured with a wake-up receiver; and causing receiving, from the user equipment, of a conditional wake-up signal operation acknowledgement.

A computer implemented system comprising: at least one processor and at least one non-transitory memory storing instructions that, when executed by the at least one processor, cause the system at least to perform: causing receiving, from a user equipment capable of performing energy harvesting, of a request for conditional wake-up signal operation; causing transmitting, to the user equipment, of at least one parameter for the conditional wake-up signal operation; causing transmitting of at least one signal for the user equipment, wherein the at least one signal may comprise one of: a wake-up signal, a wake-up indicator, a wake-up signal beacon, or a signal configured to be measured with a wake-up receiver; and causing receiving, from the user equipment, of a conditional wake-up signal operation acknowledgement.

A computer implemented system comprising: means for causing receiving, from a user equipment capable of performing energy harvesting, of a request for conditional wake-up signal operation; means for causing transmitting, to the user equipment, of at least one parameter for the conditional wake-up signal operation; means for causing transmitting of at least one signal for the user equipment, wherein the at least one signal may comprise one of: a wake-up signal, a wake-up indicator, a wake-up signal beacon, or a signal configured to be measured with a wake-up receiver; and means for causing receiving, from the user equipment, of a conditional wake-up signal operation acknowledgement.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A user equipment (UE) configured to conditionally receive downlink data based on a current energy level of the UE, the UE comprising:

at least one processor;

a wake-up receiver; and at least one memory storing instructions that, when executed by the at least one processor, cause the UE at least to:

determine a time period for determining the current energy level of the UE based on the following: a previous rate of energy arrival at the UE, a current rate of energy arrival at the UE, stored energy at the UE, and a predicted rate of energy arrival at the UE;

synchronize timing with a base station prior to a conditional wake-up signal operation;

transmit, to the base station, an indication of an energy harvesting capability of the UE;

transmit, to the base station, a request for the conditional wake-up signal operation, wherein the request comprises the determined time period;

receive, from the base station, a plurality of parameters for the conditional wake-up signal operation, wherein the plurality of parameters comprises a wake-up cycle length, a wake-up channel configuration, and a time offset for the conditional wake-up signal operation, and wherein the plurality of parameters are based, at least in part, on the transmitted time period and a quality of service (QOS) requirement provided by a core network;

receive, from the base station via a physical downlink wake-up channel (PDWCH) monitored by the wake-up receiver, at least one signal during a configured wake-up cycle, wherein the at least one signal comprises one of: a wake-up signal, a wake-up indicator, a wake-up signal beacon, or a signal configured to be measured with the wake-up receiver;

in response to receiving the at least one signal at the wake-up receiver, transition from a first sleep state to an awake state and determine the current energy level within the determined time period;

based on the determined current energy level being at or below a first energy threshold, transmit, to the base station, a first conditional wake-up signal operation acknowledgement, wherein the first conditional wake-up signal operation acknowledgement comprises an indication to delay the one or more downlink transmissions, and wherein the indication to delay the one or more downlink transmissions comprises at least one bit indicator;

transition to a second sleep state;

cause the wake-up receiver to be turned off to maximize power savings;

perform energy harvesting during the second sleep state;

during the second sleep state and at intervals defined by the wake-up cycle length, periodically determine the current energy level until the current energy level is at or above a second energy threshold;

based on the current energy level being at or above the second energy threshold, transmit a second conditional wake-up signal operation acknowledgement to request the one or more delayed downlink transmissions;

receive, from the base station, the one or more delayed downlink transmissions; and upon receiving the one or more delayed downlink transmissions, cause the wake-up receiver to be turned on and resume monitoring of the PDWCH during subsequent wake-up cycles.

2. The UE of claim 1, wherein the UE comprises at least one of:

an energy harvesting device,
a reduced capability device,
a cellular Internet of Things device,
a narrow-band Internet of Things device, or
an ambient Internet of Things device.

3. The UE of claim 1, wherein the plurality of parameters for the conditional wake-up signal operation further comprises :

an inactivity time,
a duration of on-time,
a length of a Zadoff-Chu sequence,
a group index for the PDWCH, and
a cyclic shift within a group for the PDWCH.

4. The UE of claim 1, wherein the first conditional wake-up signal operation acknowledgement comprises an indication of the current energy level.

5. The UE of claim 1, wherein to transmit the first conditional wake-up signal operation acknowledgement, the instructions, when executed by the at least one processor, cause the UE to:

in response to the current energy level being at or above the first energy threshold, transmit an indication to continue with at least one downlink transmission.

6. A method for conditionally receiving, at a user equipment (UE), downlink data based on a current energy level of the UE, the method comprising:

determining a time period for determining the current energy level based on a previous rate of energy arrival at the UE, a current rate of energy arrival at the UE, stored energy at the UE, and a predicted rate of energy arrival at the UE;

synchronizing timing with a base station prior to a conditional wake-up signal operation;

transmitting, to the base station, an indication of an energy harvesting capability of the apparatus;

transmitting, to the base station, a request for the conditional wake-up signal operation, wherein the request comprises the determined time period;

receiving, from the base station, a plurality of parameters for the conditional wake-up signal operation, wherein the plurality of parameters comprises a wake-up cycle length, a wake-up channel configuration, and a time offset for the conditional wake-up signal operation, and wherein the plurality of parameters are based, at least in part, on the transmitted time period and a quality of service (QOS) requirement provided by a core network;

receiving, from the base station via a physical downlink wake-up channel (PDWCH) monitored by a wake-up receiver, at least one signal during a configured wake-up cycle, wherein the at least one signal comprises one of: a wake-up signal, a wake-up indicator, a wake-up signal beacon, or a signal measured with the wake-up receiver;

in response to receiving the at least one signal at the wake-up receiver, transitioning from a first sleep state to an awake state and determining the current energy level within the determined time period;

based on the determined current energy level being at or below a first energy threshold, transmitting, to the base station, a first conditional wake-up signal operation acknowledgement, wherein the first conditional wake-up signal operation acknowledgement comprises an indication to delay the one or more downlink transmissions, and wherein the indication to delay the one or more downlink transmissions comprises at least one bit indicator;

transitioning to a second sleep state;

causing the wake-up receiver to be turned off to maximize power savings; and performing energy harvesting during the second sleep state;

during the second sleep state and at intervals defined by the wake-up cycle length, periodically determining the current energy level until the current energy level is at or above a second energy threshold;

based on the current energy level being at or above the second energy threshold, transmitting a second conditional wake-up signal operation acknowledgement to request the one or more delayed downlink transmissions;

receiving, from the base station, the one or more delayed downlink transmissions; and after receiving the one or more delayed downlink transmissions, causing the wake-up receiver to be turned on and resume monitoring of the PDWCH during subsequent wake-up cycles.

* * * * *